United States Patent
Tochizawa (10) Patent No.: US 9,359,980 B2
(45) Date of Patent: Jun. 7, 2016

(54) INTAKE SYSTEM

(75) Inventor: Tohru Tochizawa, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/703,835

(22) PCT Filed: Jul. 3, 2011

(86) PCT No.: PCT/JP2011/003788
§ 371 (c)(1),
(2), (4) Date: Dec. 12, 2012

(87) PCT Pub. No.: WO2012/014377
PCT Pub. Date: Feb. 2, 2012

(65) Prior Publication Data
US 2013/0118433 A1    May 16, 2013

(30) Foreign Application Priority Data

Jul. 30, 2010   (JP) ................ 2010-172772

(51) Int. Cl.
*F02M 35/10* (2006.01)
*F02M 35/104* (2006.01)
*F02M 25/07* (2006.01)
*F02M 35/112* (2006.01)

(52) U.S. Cl.
CPC ......... *F02M 35/104* (2013.01); *F02M 25/0703* (2013.01); *F02M 25/0723* (2013.01);
(Continued)

(58) Field of Classification Search
CPC .......... F02M 35/10321; F02M 35/10144; F02M 35/112; F02M 35/116; F02M 35/10052; F02B 75/22; F02B 27/00

USPC .............. 123/184.21, 184.34, 184.24, 184.42
See application file for complete search history.

(56) References Cited

U.S. PATENT DOCUMENTS 5,630,387 A * 5/1997 Kamiyama .............. 123/184.38
6,363,900 B1 * 4/2002 Homi et al. ............... 123/184.21
(Continued)

FOREIGN PATENT DOCUMENTS

JP    2005-155396 A    6/2005
JP    2005-155396 A    6/2005
(Continued)

OTHER PUBLICATIONS

Japanese Office Action dated Jul. 8, 2014, issued in corresponding Japanese Patent Application No. 2012-526281 (9 pages).

*Primary Examiner* — Lindsay Low
*Assistant Examiner* — Syed O Hasan
(74) *Attorney, Agent, or Firm* — Westerman, Hattori, Daniels & Adrian, LLP (57) ABSTRACT

Provided is an intake system that enables extension of an intake air introduction pipe without increasing the external dimension of the intake system. The intake system comprises: a plurality of branch pipes (27-30) which are arranged one next to the other and communicate at downstream ends thereof with a plurality of intake ports (14) provided in an engine (10), respectively, each branch pipe extending from the downstream end thereof to an upstream end thereof in a curved manner; an intake chamber (26) communicating with the upstream ends of the branch pipes; and an intake air introduction pipe (25) having a downstream end communicating with the intake chamber, wherein the intake air introduction pipe has a section that extends in a space defined between the branch pipes and the engine in a direction of arrangement of the branch pipes.

14 Claims, 10 Drawing Sheets

(52) U.S. Cl.
CPC ..... *F02M25/0747* (2013.01); *F02M 35/10026* (2013.01); *F02M 35/10085* (2013.01); *F02M 35/10222* (2013.01); *F02M 35/112* (2013.01); *Y02T 10/121* (2013.01)

(56) References Cited

U.S. PATENT DOCUMENTS

| | | | |
|---|---|---|---|
| 7,131,415 B2 * | 11/2006 | Enokida et al. | 123/184.24 |
| 2005/0263143 A1 | 12/2005 | Matsuoka et al. | |
| 2009/0133658 A1 | 5/2009 | Fukuda et al. | |
| 2011/0277717 A1 * | 11/2011 | Groleau et al. | 123/184.34 |

FOREIGN PATENT DOCUMENTS

| | | |
|---|---|---|
| JP | 2005-337117 A | 12/2005 |
| JP | 2006-090216 A | 4/2006 |
| JP | 2008-75513 A | 4/2008 |
| JP | 2008-082291 A | 4/2008 |
| JP | 2008-223497 A | 9/2008 |
| JP | 2008-223497 A | 9/2008 |
| JP | 2009-91952 A | 4/2009 |
| JP | 2009-091952 A | 4/2009 |

* cited by examiner

INTAKE SYSTEM

CROSS-REFERENCE TO RELATED APPLICATION

This application is a National Stage entry of International Application No. PCT/JP2011/003788, filed Jul. 3, 2011, which claims priority to Japanese Patent Application No. 2010-172772, filed Jul. 30, 2010, the disclosure of the prior applications are hereby incorporated in their entirety by reference.

TECHNICAL FIELD

The present invention relates to an intake system for a multi-cylinder engine.

BACKGROUND ART

An intake system for a multi-cylinder engine typically includes an intake manifold constituted by branch pipes respectively communicating with intake ports of corresponding cylinders, an intake chamber (intake air collecting portion) communicating with each branch pipe, and an intake air introduction pipe communicating with the intake chamber. In such an intake system, there is a problem that since each branch pipe is joined to a side of a cylinder head substantially perpendicularly thereto, the branch pipes tend to protrude to the side of the engine and increase the external dimension of the entire engine. To solve such a problem, there is proposed an intake system in which each branch pipe extends to curve upward (toward the head cover) from the downstream end to the upstream end, thereby to place the air intake chamber close to the head cover and make the entire engine compact (for example, see patent document 1).

PRIOR ART DOCUMENT(S)

Patent Document(s)

Patent Document 1: JP 2008-75513A

BRIEF SUMMARY OF THE INVENTION

Task to be Accomplished by the Invention

However, in the intake system disclosed in patent document 1, the intake air introduction pipe connected to the upstream side of the intake chamber projects outward, and thus, if the intake air introduction pipe is extended, the dimension of the intake system, and hence the dimension of the internal combustion engine, is increased by an increased length of the intake air introduction pipe.

The present invention is made to address the aforementioned problem, and the objective of the present invention is to provide an intake system that enables extension of an intake air introduction pipe without increasing the external dimension of the intake system.

Means to Accomplish the Task

To accomplish the above task, the present invention provides an intake system, comprising: a plurality of branch pipes (27-30) which are arranged one next to the other and communicate at downstream ends thereof with a plurality of intake ports (14) provided in an engine (10), respectively, each branch pipe extending from the downstream end thereof to an upstream end thereof in a curved manner; an intake chamber (26) communicating with the upstream ends of the branch pipes; and an intake air introduction pipe (25) having a downstream end communicating with the intake chamber, wherein the intake air introduction pipe has a section that extends in a space defined between the branch pipes and the engine in a direction of arrangement of the branch pipes.

According to this structure, the intake air introduction pipe is disposed in a dead space formed by the curved branch pipes, and the external dimension of the intake system can be reduced. Further, since the intake air introduction pipe is disposed in the dead space, extension of the intake air introduction pipe would be less likely to affect the external dimension of the intake system.

Another aspect of the present invention is characterized in that the intake air introduction pipe comprises: a downstream section (34) which communicates with the intake chamber and extends along the branch pipes between adjacent two (28, 29) of the branch pipes; and an upstream section (35) which extends from an upstream end of the downstream section in the direction of arrangement of the branch pipes in the space defined between the branch pipes and the engine.

According to this structure, since the downstream section of the intake air introduction pipe and the branch pipes are arranged to extend along each other, the direction of flow of air introduced into the intake chamber and the direction of flow of air discharged from the intake chamber are opposite to each other. This suppresses unbalanced distribution of air from the intake air introduction pipe to some of the branch pipes, and the amounts of intake air into the intake ports (cylinders) are equalized.

Another aspect of the present invention is characterized in that the intake system comprises an even number of the branch pipes arranged symmetrically about the intake air introduction pipe.

According to this structure, it is possible to further equalize the amounts of air flowing through the branch pipes. Moreover, as a result of this, turbulence occurring in the intake chamber is suppressed and so is generation of noise.

Another aspect of the present invention is characterized in that: the intake ports open out from the engine in a first direction; the intake chamber faces the engine in a direction perpendicular to the first direction; and the branch pipes curve in such a manner that a convex side of each branch pipe faces in the first direction away from the engine.

According to this structure, since the branch pipes curve in such a manner that the convex side of each branch pipe faces in the first direction away from the engine, it is possible to ensure a long path length of each branch pipe and to accommodate the intake air introduction pipe in the space formed between the branch pipes and the engine, thereby achieving a compact intake system.

Another aspect of the present invention is characterized in that an intake air guiding wall (36) extends from a pipe wall of the intake air introduction pipe into the intake chamber at a portion of the intake air introduction pipe communicating with the intake chamber.

According to this structure, it is possible to further suppress unbalanced distribution of air from the intake air introduction pipe to some of the branch pipes adjoining the intake air introduction pipe, and the amounts of air flowing through the branch pipes are equalized.

Another aspect of the present invention is characterized in that the intake air guiding wall connects mutually opposing inner surfaces (37, 38) of the intake chamber to each other.

According to this structure, the intake air guiding wall can also serve as a reinforcing member for the intake chamber.

Effect of the Invention

With the foregoing structure, an intake system enables extension of an intake air introduction pipe without increasing the external dimension of the intake system.

PREFERRED EMBODIMENT OF THE INVENTION

First Embodiment

Now, a detailed description will be given of a first embodiment wherein the present invention is applied to an intake system for an automobile engine. In the following description, it is assumed that the direction in which the automobile moves forward corresponds to a frontward direction (see the coordinate axes in FIG. 1).

<Overall Structure of Engine>

Figure 1:
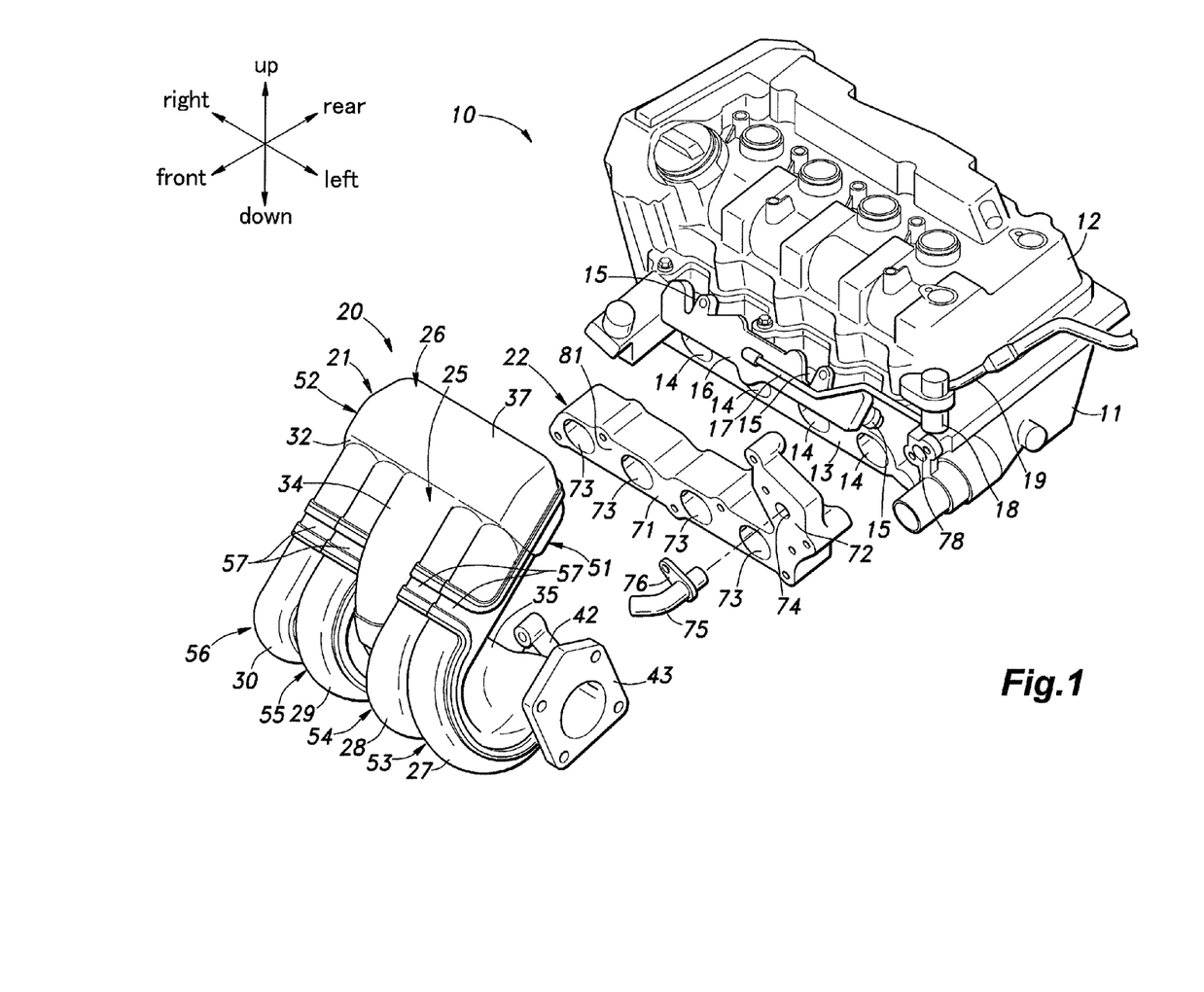
FIG. 1 is an exploded perspective view of an engine including an intake system according to an embodiment.

As shown in FIG. 1, a four-cylinder engine 10 (hereinafter, simply referred to as an engine) is designed to be laterally disposed in an engine room of an automobile such that the crankshaft extends in a left and right direction. The engine 10 is provided with a cylinder block not shown in the drawings, a cylinder head 11 fastened to the top of the cylinder block, and a head cover 12 fastened to the top of the cylinder head 11. Formed in the cylinder block 11 are four cylinders respectively extending in an up and down direction and arranged in a row in the left and right direction. Namely, the cylinders have respective cylinder axes extending substantially in the up and down direction and form a cylinder row extending in the left and right direction. In each cylinder, a piston connected to the crankshaft via a con-rod is accommodated slidably.

Combustion chambers (not shown in the drawing) are recessed in portions of the cylinder head 11 corresponding to the respective cylinders. Formed to extend from each combustion chamber are an intake port 14 and an exhaust port (not shown in the drawing), where the intake port 14 extends frontward and opens in a front surface 13 of the cylinder head 11, and the exhaust port extends rearward and opens in a rear surface of the cylinder head 11. Namely, each intake port 14 extends substantially in a fore and aft direction, which is perpendicular to a cylinder axis direction (up and down direction) and a cylinder row direction (left and right direction). Also provided in the cylinder head 11 are intake valves and exhaust valves, where each intake valve opens and closes between the corresponding intake port 14 and combustion chamber, and each exhaust valve opens and closes between the corresponding exhaust port and combustion chamber. The head cover 12 assumes a box-like shape having an open bottom and is fastened to the cylinder head 11 at a flange portion formed along the periphery of its open end, such that a space is defined between the head cover 12 and the cylinder head 11. Provided in this space is a valve operating mechanism constituted by a cam shaft(s), rocker arms, and so on, for driving the intake and exhaust valves.

Further, fuel injection valves 15 corresponding to the respective intake ports 14 are provided in a front portion of the cylinder head 11. Each fuel injection valve 15 has an inner end having an injection hole formed therein and protruding into the corresponding intake port 14, and an outer end protruding upward from the cylinder head 11. The outer end of each fuel injection valve 15 is connected to a delivery pipe 16 extending in the left and right direction. The delivery pipe 16 is disposed above the front surface 13, and has an intermediate portion in the left and right direction, to which is connected a right end of a first fuel pipe 17 which extends in the left and right direction. A left end of the first fuel pipe 17 is connected to a fuel joint 18 disposed above a front left corner of the cylinder head 11. Connected to the fuel joint 18 is a second fuel pipe 19, which extends from a fuel tank. Due to this structure, the fuel stored in the fuel tank is supplied to each fuel injection valve 15 after flowing through the second fuel pipe 19, the fuel joint 18, the first fuel pipe 17, and the delivery pipe 16 in this order.

<Structure of Intake System>

As shown in FIG. 1, an intake system 20 for introducing air into each intake port 14 is provided on the front surface 13 of the cylinder head 11. The intake system 20 includes an intake manifold 21, an intake plate 22, a throttle valve 23 (see FIG. 2), an air filter, and an air inlet, the air filter and the air inlet being not shown in the drawings. The intake manifold 21 is fastened to the front surface 13 of the cylinder head 11 via the intake plate 22.

As shown in FIGS. 1-7, the intake manifold 21 includes an intake air introduction pipe 25, an intake chamber (intake air collecting portion) 26, and four branch pipes 27-30. The branch pipes 27-30 are arranged in a row in the left and right direction. In this embodiment, these branch pipes will be referred to from left to right as a first branch pipe 27, a second branch pipe 28, a third branch pipe 29, and a fourth branch pipe 30. Each branch pipe 27-30 has a downstream end opening in the rearward direction, and extends upward from the downstream end thereof to an upstream end thereof in a curved manner such that a convex side of each branch pipe 27-30 faces in the frontward direction (namely, a direction perpendicular to the cylinder axis direction (up and down direction) and the cylinder row direction (left and right direction)).

Figure 2:
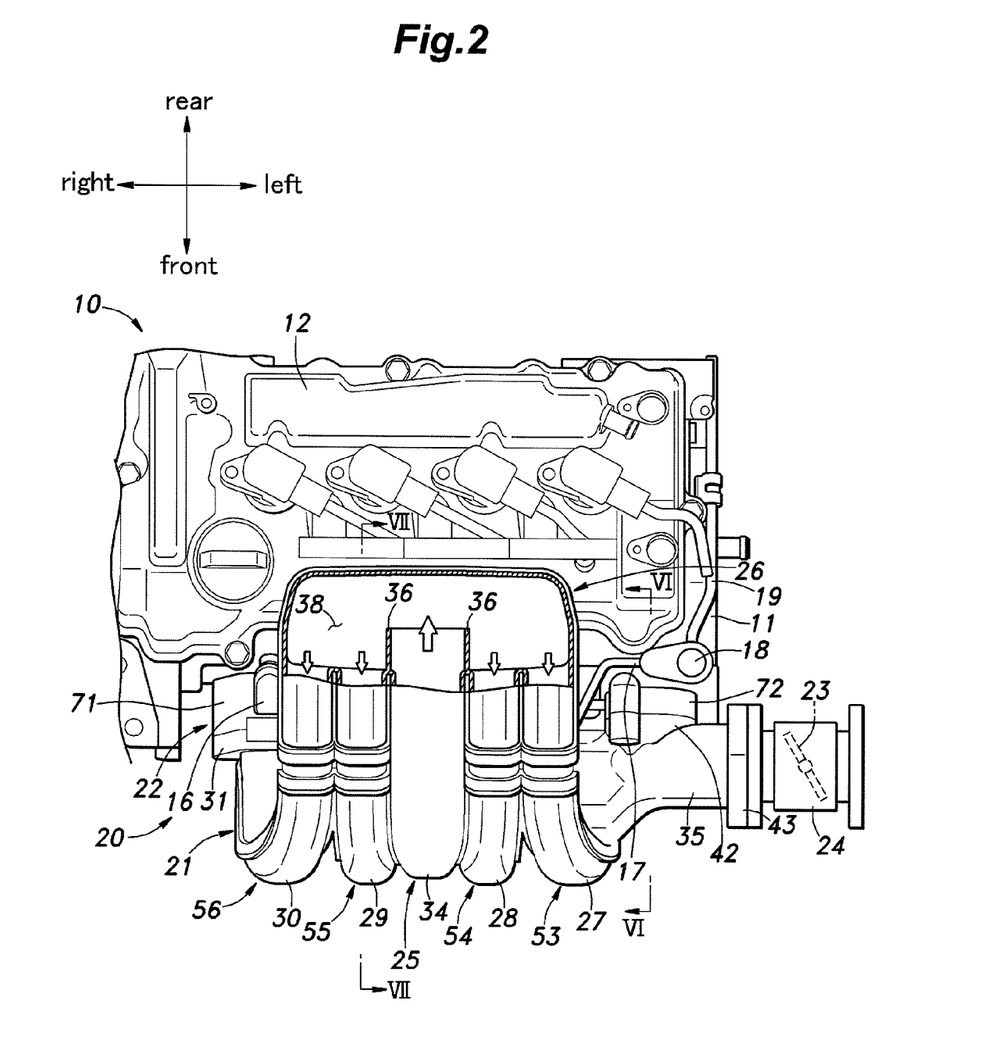
FIG. 2 is a plan view showing the engine including the intake system according to the embodiment, where the engine is shown with a part thereof being broken away.
Figure 3:
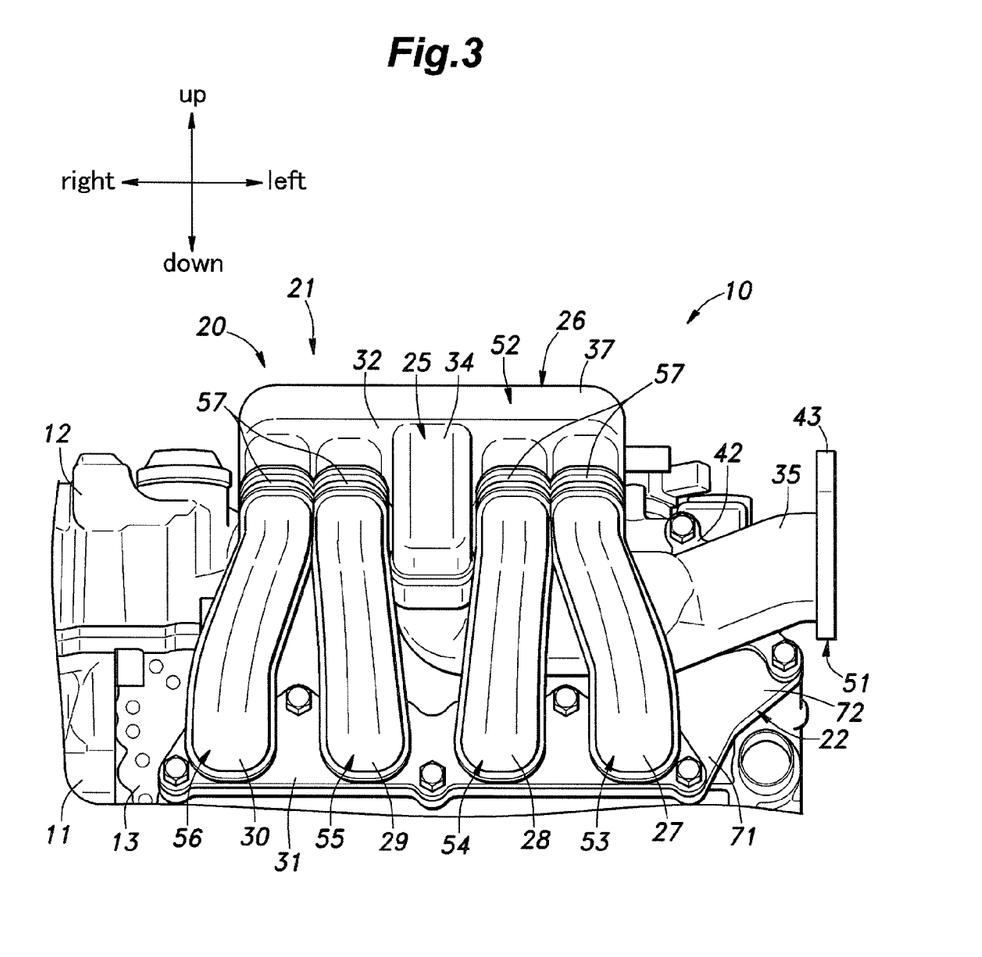
FIG. 3 is a front view of the engine including the intake system according to the embodiment.
Figure 4:
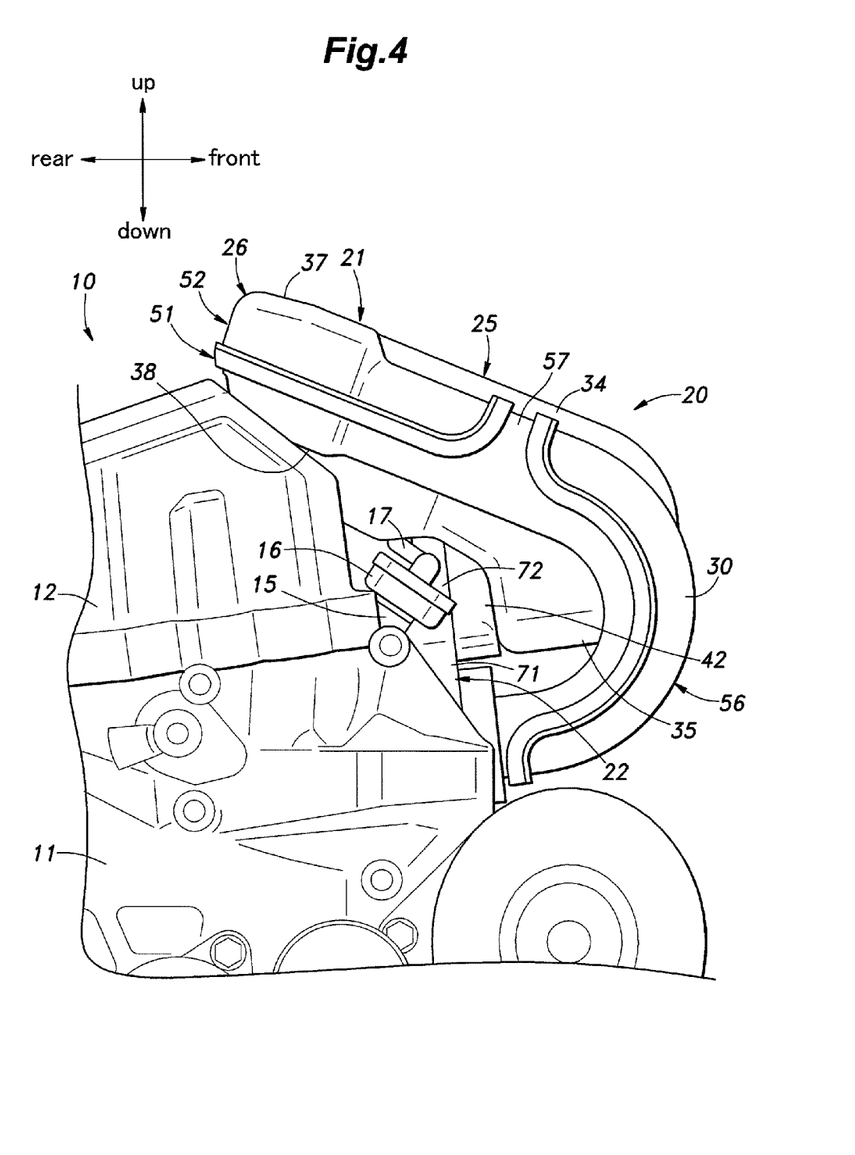
FIG. 4 is a side view of the engine including the intake system according to the embodiment.

As shown in FIGS. 1-3, the upstream sections of the first branch pipe 27 and the second branch pipe 28 are in close contact with each other in the left and right direction, and the downstream sections of these branch pipes are apart from each other in the left and right direction. Similarly, the upstream sections of the third branch pipe 29 and the fourth branch pipe 30 are in close contact with each other in the left and right direction, and the downstream sections of these branch pipes are apart from each other in the left and right direction. The second branch pipe 28 and the third branch pipe 29 are apart from each other in the left and right direction. The distance between the upstream sections of the second branch pipe 28 and the third branch pipe 29 is set to be larger than an outer diameter of each branch pipe 27-30. The branch pipes 27-30 have a common first flange portion 31 formed to connect the downstream ends thereof.

The intake chamber 26 assumes a box-like shape of a substantially rectangular parallelepiped extending in the left and right direction, and is disposed obliquely such that a front wall 32 of the intake chamber 26 faces in an obliquely downward direction. Further, the intake chamber 26 is disposed such that at least a part thereof faces the engine 10 (head cover 12) in a direction (up and down direction) perpendicular to the direction (fore and aft direction) in which the intake ports 14 open. The upstream ends of the branch pipes 27-30 are connected to the front wall 32 of the intake chamber 26 in a row in the left and right direction, such that the interior of the intake chamber 26 and that of each branch pipe 27-30 communicate with each other.

The intake air introduction pipe 25 has a downstream section 34 connected to the intake chamber 26, and an upstream section 35 connected to the downstream section 34. The downstream section 34 and the upstream section 35 of the intake air introduction pipe 25 are each formed to have an inner diameter and an outer diameter that are larger than those of the branch pipes 27-30. A downstream end of the downstream section 34 is connected to the front surface 32 of the intake chamber 26 at a position between where the second branch pipe 28 is connected to the front surface 32 and where the third branch pipe 29 is connected to the front surface 32, so as to be in communication with the interior of the intake chamber 26. The downstream section 34 extends along the second branch pipe 28 and the third branch pipe 29 between the second branch pipe 28 and the third branch pipe 29. The boundary between the downstream section 34 and the upstream section 35 is located at a part corresponding to an intermediate part of a curved portion of the second branch pipe 28, and the upstream section 35 curves inward (rearward) from this boundary beyond the curved portion of the second branch pipe 28, and then extends leftward behind the curved portions of the second branch pipe 28 and the first branch pipe 27 to such an extent that the upstream end of the upstream section 35 projects to the left of the first branch pipe 27.

Figure 7:
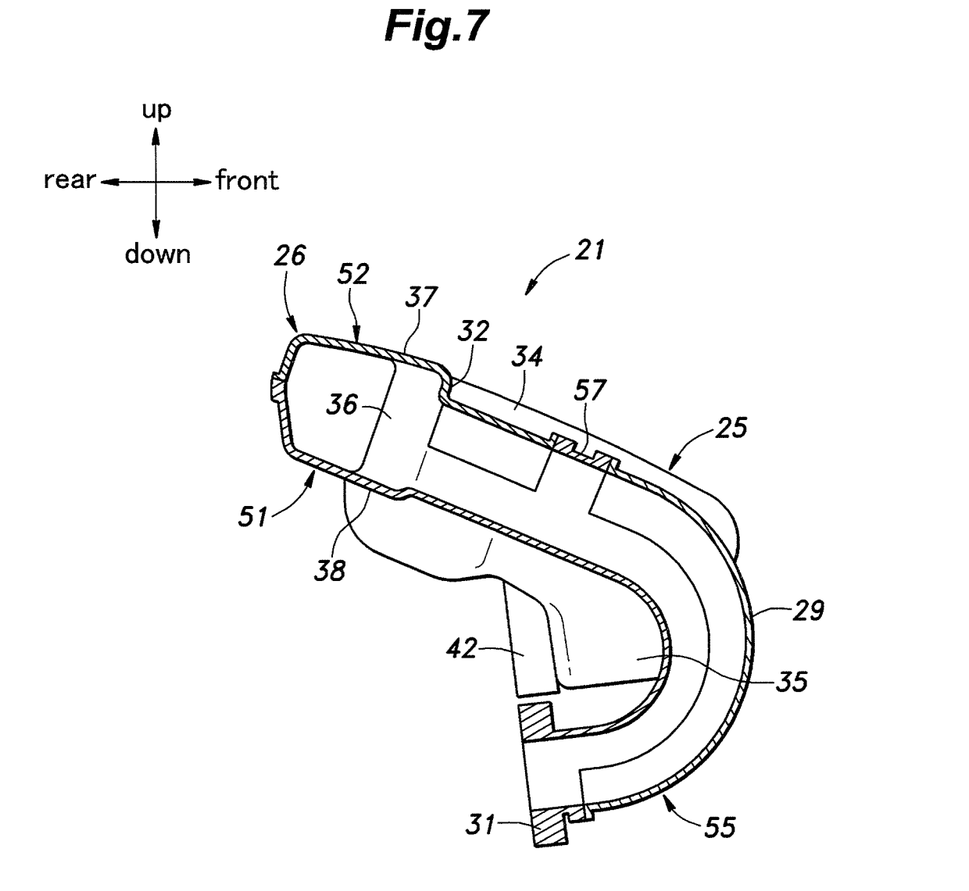
FIG. 7 is a cross-sectional view taken along line VII-VII in FIG. 2.

As shown in FIGS. 2 and 7, a pair of plate-shaped intake air guiding walls 36 are provided inside the intake chamber 26 on either side of the portion where the downstream section 34 is connected to the front wall 22; namely, at the boundary between the portion where the downstream section 34 is connected to the front wall 32 and the portion where the second branch pipe 28 is connected to the front wall 32 and at the boundary between the portion where the downstream section 34 is connected to the front wall 32 and the portion where the third branch pipe 29 is connected to the front wall 32, respectively. Each intake air guiding wall 36 has a principal surface facing in the left and right direction, and extends from the front wall 32 of the intake chamber 26 into the intake chamber 26 (rearward) so as to join an upper wall 37, which is connected to the upper end of the front wall 32, and a lower wall 38, which is connected to the lower end of the front wall 32. In other words, the intake air guiding walls 36 are provided so as to extend the downstream end of the downstream section 34 into the intake chamber 26.

Figure 5:
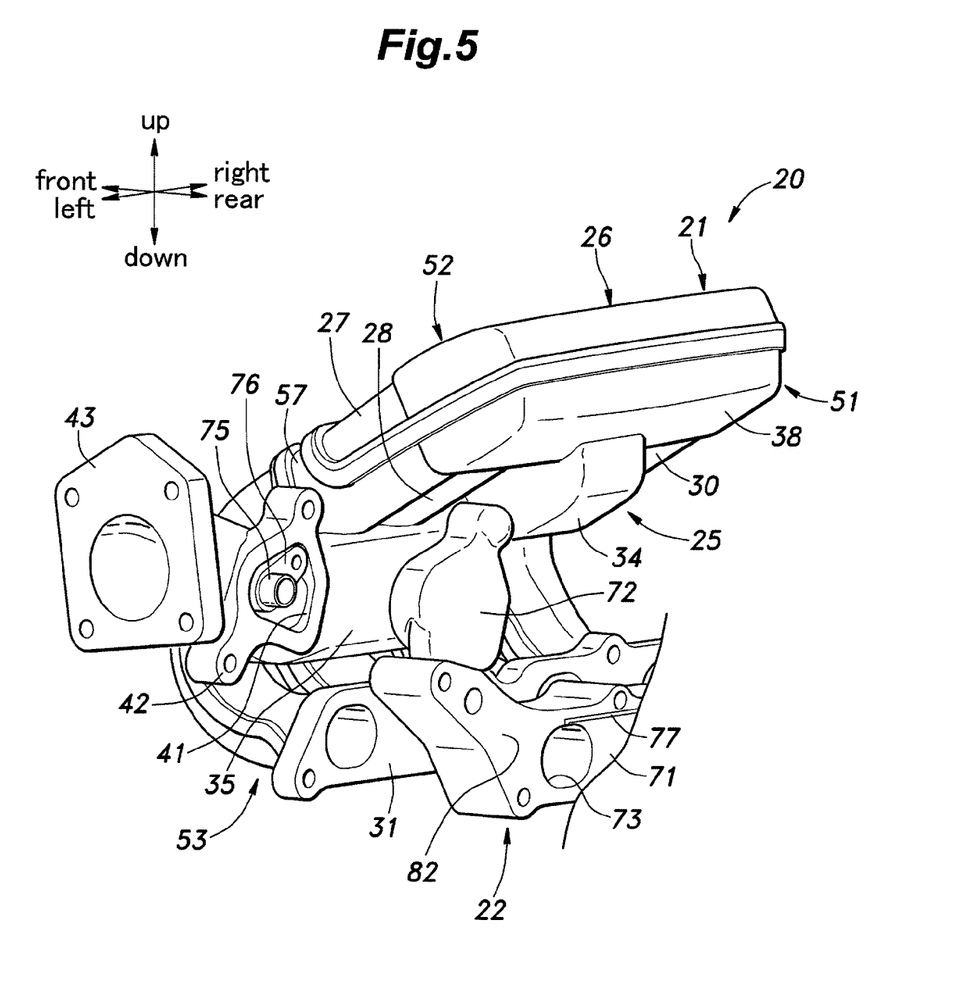
FIG. 5 is an exploded perspective view of the intake system according to the embodiment as viewed from the rear thereof.
Figure 6:
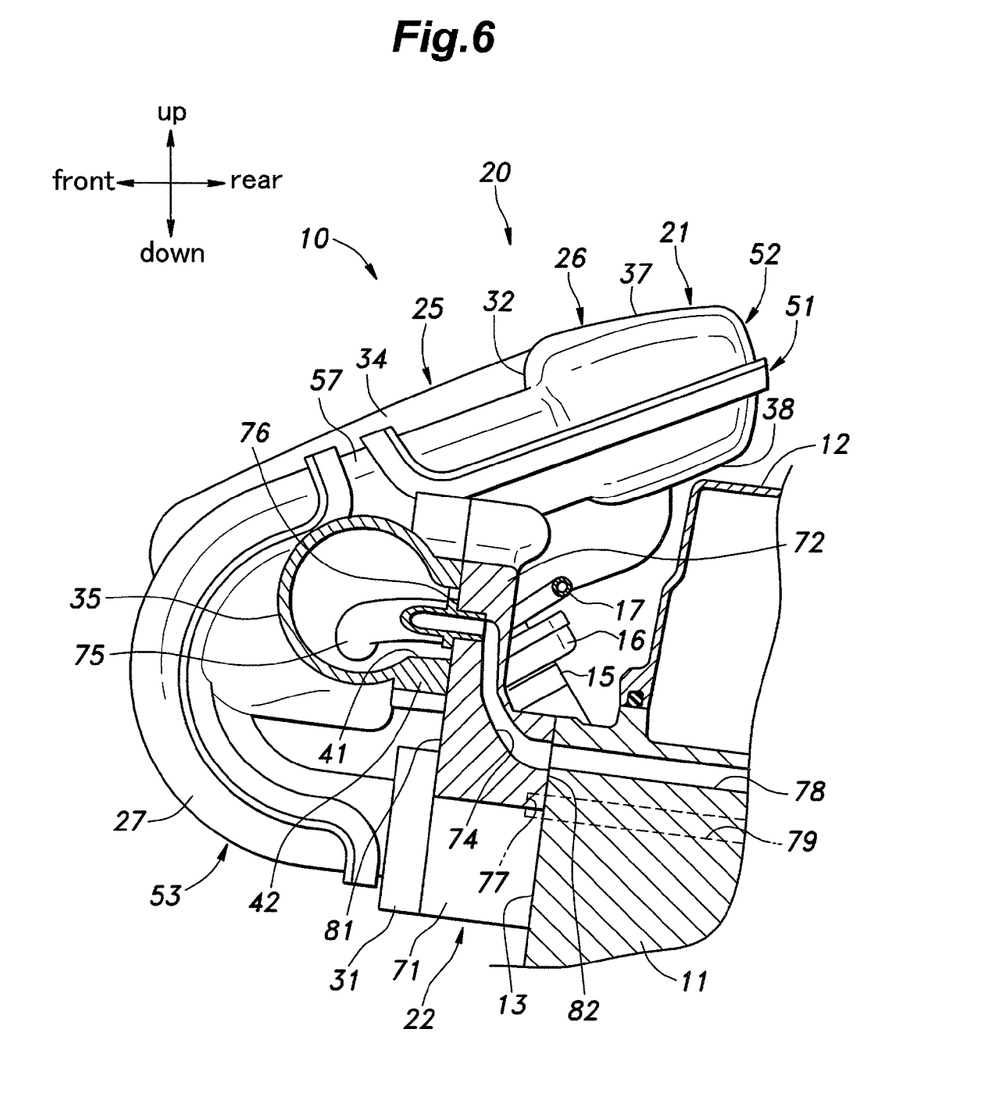
FIG. 6 is a cross-sectional view taken along line VI-VI in FIG. 2.

The upstream section 35 has a front portion that is integrally connected to an inner circumferential portion (rear portion) of the curved portion of each of the first branch pipe 27 and the second branch pipe 28. It is to be noted that the interior of the upstream section 35 and the interior of each of the first branch pipe 27 and the second branch pipe 28 are separated from each other, and do not communicate with each other. As shown in FIGS. 5 and 6, an EGR introduction hole 41 is formed at a rear portion of the upstream section 35 in the vicinity of an upstream end (left end) of the same to enable communication between an interior and an exterior of the pipe. A second flange portion 42 providing a joint surface is formed around a periphery of the EGR introduction hole 41. The joint surface of the second flange portion 42 is positioned on a virtual plane including the joint surface of the first flange portion 31.

A third flange portion 43 is formed in the upstream end of the upstream section 35. As shown in FIG. 2, a throttle body 24 constituting an outer shell of the throttle valve 23 is joined to the third flange portion 43. An air inlet is provided on the upstream side of the throttle body 24 via an air cleaner or the like. Due to this structure, the air taken in through the air inlet passes through the air cleaner and the throttle valve, and then, via the intake air introduction pipe 25 and the intake chamber 26, is distributed to each of the branch pipes 27-30.

The intake manifold 21 is formed by joining divided parts together, each divided part being formed of a resin material by injection molding. In this embodiment, the intake manifold 21 includes first to sixth parts 51-56, and these parts 51-56 each have a flange portion providing an abutment surface at a mutual joint, and are joined together by means of thermal welding, vibration welding or the like.

The first part 51 integrally constitutes a rear portion of each branch pipe 27-30, a lower half of the intake chamber 26, the upstream section 35 of the intake air introduction pipe 25, a lower half of the downstream section 34 of the intake air introduction pipe 25, the first flange portion 31, the second flange portion 42, and the third flange portion 43. The rear portion of each branch pipe 27-30 in the first part 51 has a half-split shape resulting from halving each branch pipe 27-30 in a circumferential direction, and extends from the downstream end to the upstream end to constitute an inner circumferential side of the curved portion. Further, the rear portion of each branch pipe 27-30 constituting the first part 51 has, at a longitudinally intermediate portion of each branch pipe 27-30, a ring portion 57 constituting the entire circumference of each branch pipe 27-30. Furthermore, the pair of intake air guiding walls 36 are formed integrally in the lower half of the intake chamber 26.

The second part 52 integrally constitutes an upper half of the intake chamber 26, an upstream front portion of each branch pipe 27-30, and an upper half of the downstream section 34 of the intake air introduction pipe 25. The upstream front portion of each branch pipe 27-30 in the second part 52 constitutes a front portion of a section of each branch pipe 27-30 extending from the upstream end to the ring portion 57, and in combination with the first part 51, constitutes the upstream section of each branch pipe 27-30. The upper half of the intake chamber 26 in the second part 52, in combination with the lower half of the intake chamber 26 and the intake air guiding walls 36 in the first part 51, constitutes the intake chamber 26. The upper half of the intake chamber 26 is joined to the upper ends of the intake air guiding walls 36 formed in the lower half of the intake chamber 26. The upper half of the downstream section 34 of the intake air introduction pipe 25 in the second part 52, in combination with the lower half of the downstream section 34 and the upstream section 35 of the intake air introduction pipe 25 in the first part 51, constitutes the intake air introduction pipe 25.

The third to sixth parts 53-56 constitute downstream front portions of the branch pipes 27-30, respectively. Each of the third to sixth parts 53-56 has a half-split shape resulting from halving the respective branch pipe 27-30 in a circumferential direction, and extends from the downstream end to the ring portion 57 to constitute an outer circumferential side of the curved portion. The third to sixth parts 53-56, in combination with the rear portions of the branch pipes 27-30 in the first part 51, constitute the downstream sections (curved portions) of the respective branch pipes 27-30. In another embodiment, the third part 53 and the fourth part 54 may be integrally connected to each other at a certain part to form a single component part. Similarly, the fifth part 55 and the sixth part 56 may be formed as a single component part.

As shown in FIG. 1, the intake plate 22 is a plate member made of a metallic material such as an aluminum alloy, for example, with a principal surface facing in the fore and aft direction, and includes a base portion 71 extending in the left and right direction and an extension portion 72 projecting upward from the left end of the base portion 71. The extension portion 72 is thinner in the fore and aft direction than the base portion 71, and is disposed beside the front of the base portion 71 so as to form a single front surface 81 in combination with the base portion 71. The base portion 71 has four intake passages 73 extending therethrough in the fore and aft direction such that the intake passages 73 are arranged in a row in the left and right direction.

As shown in FIGS. 1 and 5, a front end of an EGR passage 74 for circulating a part of the exhaust gas taken out from an exhaust system is provided opens in the front surface 81 of the extension portion 72. As shown in FIGS. 5 and 6, the EGR passage 74 extends from the front end downward in the extension portion 72 and reaches the base portion 71, such that a rear end of the EGR passage 74 opens in a rear surface of the base portion 71 near the left end. An EGR introduction pipe 75 is connected to the front end of the EGR passage 74. The EGR introduction pipe 75 is bent substantially in the shape of a rectangular letter C, and the rear end thereof is fitted into the front end of the EGR passage 74. Further, the EGR introduction pipe 75 has a fastening flange 76 at a portion apart from the rear end thereof, and is fastened to the front surface 81 of the extension portion 72 by means of a bolt or the like. In the state where the EGR introduction pipe 75 has been fastened to the intake plate 22, the front end of the EGR introduction pipe 75 protrudes frontward and rightward relative to the front surface 81 of the extension portion 72.

As shown in FIG. 5, a blow-by gas distribution groove 77 for supplying blow-by gas to each intake passage 73 extends in a rear surface 82 of the base portion 71 of the intake plate 22. The blow-by gas distribution groove 77 is split into four branches, from one end to the other, so as to be in communication with each intake passage 73. In the state where the intake plate 22 has been attached to the cylinder head 11, the blow-by gas distribution groove 77 defines a blow-by gas distribution passage in combination with the front surface 13 of the cylinder head 11.

The cylinder head 11 has an EGR supply passage 78 (see FIGS. 1 and 6) and a blow-by gas supply passage 79 (FIG. 6) formed therein. The EGR supply passage 78 is a passage for circulating the exhaust gas taken out from the exhaust system not shown in the drawings, and has one end opening in a left end portion of the front surface 13 of the cylinder head 11 and the other end communicating with the exhaust system via a control valve or the like. The blow-by gas supply passage 79 is a passage for circulating the blow-by gas leaking into the crankcase from each cylinder, and has one end opening in the front surface 13 of the cylinder head 11 and the other end communicating with, e.g., a breather chamber or an oil mist separator formed in the head cover 12.

The first flange portion 31 of the intake manifold 21 is fastened to the front surface 13 of the cylinder head 11 by means of bolts, with the intake plate 22 being interposed between the first flange portion 31 and the front surface 13 of the cylinder head 11. It is to be noted that gaskets (not shown in the drawings) are placed between the joint surface of the first flange portion 31 and the front surface 81 of the intake plate 22 and between the rear surface 82 of the intake plate 22 and the front surface 13 of the cylinder head 11, respectively, so that these members are fastened together air-tightly. In the state where the first flange portion 31 has been joined to the front surface 13 of the cylinder head 11 via the intake plate 22, the branch pipes 27-30 communicate with the corresponding intake ports 14 via the intake passages 73.

Further, as shown in FIG. 6, the rear end of the EGR passage 74 opening in the rear surface 82 of the intake plate 22 communicates with the EGR supply passage 78 opening in the front surface 13 of the cylinder head 11. The second flange portion 42 abuts the extension portion 72 of the intake plate 22 so as to surround the front end of the EGR passage 74 opening in the front surface 81 of the intake plate 22, whereby, as viewed in the fore and aft direction, the front end of the EGR passage 74 is positioned inside the EGR introduction hole 41. The EGR introduction pipe 75 passes through the EGR introduction hole 41, projects into an interior of the upstream section 35 of the intake air introduction pipe 25, and extends in the upstream section 35 toward a downstream side. Due to this structure, EGR gas supplied from the EGR supply passage 78 flows through the EGR passage 74 in the intake plate 22, and is introduced into the upstream section 35 of the intake manifold 21.

As shown in FIG. 6, in the state where the intake plate 22 has been joined to the front surface 13 of the cylinder head 11, the extension portion 72 is positioned in front of a longitudinal part of the first fuel pipe 17. Due to this structure, the extension portion 72 covers the front of the first fuel pipe 17, and protects the first fuel pipe 17 against a load applied to the engine 10 from the front.

In the state where the intake plate 22 has been joined to the front surface 13 of the cylinder head 11, the blow-by gas distribution groove 77 formed in the rear surface 82 of the intake plate 22 and the front surface 13 cooperate to form a blow-by gas distribution passage, and this blow-by gas distribution passage communicates with the blow-by gas supply passage 79 which opens in the front surface 13. Due to this structure, the blow-by gas supplied from the blow-by gas supply passage 79 is supplied to each intake passage 73 via the blow-by gas distribution passage.

<Effects of Intake System>

In the intake system 20 configured as described in the foregoing, each branch pipe 27-30 extends forward from the front surface 13 of the cylinder head 11 and curves upward and rearward, and the intake chamber 26 is positioned close to the head cover 12. Further, the intake air introduction pipe 25 is disposed in a dead space defined between the branch pipes 27-30 and the intake chamber 26, and the cylinder head 11 and the head cover 12. Since the intake air introduction pipe 25 is disposed in a dead space as described in the foregoing, if the intake air introduction pipe 25 is extended, it will only fill up the dead space, and thus, the external dimension of the intake system 20 can be made relatively small and the influence imparted on the size of the entire engine 10 can be reduced.

Further, by providing the EGR introduction hole 41 in the upstream section 35 of the intake air introduction pipe 25, which can be extended, and introducing EGR gas therethrough, it is possible to increase the path length from the portion where EGR gas is introduced to the intake chamber 26. This enables air and EGR gas to be mixed more homogeneously within the intake air introduction pipe 25, and makes the EGR gas concentration in the air distributed to the respective branch pipes 27-30 more uniform. Further, by adopting the structure in which EGR gas is introduced into the intake air introduction pipe 25, it is possible to reduce the number of passages required for circulating EGR gas and simplify the structure of the intake system 20, as compared to a case where EGR gas is introduced into each branch pipe 27-30 individually.

The intake air introduction pipe 25 and the branch pipes 27-30 are arranged in a row and are connected to the intake chamber 26 from the same direction, and thus, the direction of air flowing into the intake chamber 26 and the direction of air flowing out of the intake chamber 26 are opposite to each other. Thus, the direction of airflow changes within the intake chamber 26, enabling the intake chamber 26 to be filled with air evenly. As a result of these effects, concentrated airflow from the intake air introduction pipe 25 to a particular one(s) of the branch pipes 27-30 is suppressed, and the amounts of air supplied to the respective branch pipes 27-30 are equalized. Further, due to the structure in which the intake air introduction pipe 25 and the branch pipes 27-30 are arranged left-right symmetrically and the intake air guiding walls 36 are provided between the intake air introduction pipe 25 and the second branch pipe 28 and between the intake air introduction pipe 25 and the third branch pipe 29, respectively, it is possible to obstruct the airflow to the second branch pipe 28 and the third branch pipe 29, which are adjacent to the intake air introduction pipe 25, thereby equalizing the amounts of air supplied to the branch pipes 27-30.

The intake manifold 21 according to the illustrated embodiment is formed by joining the six divided parts 51-56 together. Since the first flange portion 31 and the second flange portion 42, which are portions to be joined to the intake plate 22, are formed in the first part 51, which is a single component part, the relative positioning accuracy of the joint surfaces of the first flange portion 31 and the second flange portion 42 is not affected by the assembling accuracy (welding accuracy) of the parts 51-56. This improves the joining accuracy of the intake manifold 21 and the intake plate 22. Further, since the joint surfaces of the first flange portion 31 and the second flange portion 42 are positioned on a single virtual plane, the front surface 81 of the base portion 71 and the extension portion 82 of the intake plate 22 can be a single continuous flat surface, thereby allowing easy manufacture.

The intake plate 22 according to the illustrated embodiment integrally includes the EGR passage 74 for circulating EGR gas and the blow-by gas distribution groove 77 for circulating blow-by gas, and thus, as compared to a case where the passages for circulating EGR gas and blow-by gas are formed separately, the number of component parts is reduced and the structure is simplified. Further, the extension portion 72 of the intake plate 22 extends to be in front of the first fuel pipe 17, and thus, can protect the fuel pipe 17 against a load applied from the front. Furthermore, the extension portion 72 of the intake plate 22, the throttle body 24, and the third flange portion 43 are disposed to the left of the first fuel pipe 17, whereby the first fuel pipe 17 is protected against a load applied from the left.

Second Embodiment

As compared to the intake system 20 of the first embodiment, an intake system 100 according to a second embodiment is different significantly in the point that an intake manifold 101 has a blow-by gas introduction passage 120. Further, the dividing structure of the intake manifold 101 is different from the dividing structure of the intake manifold 21. In the following description, the component parts of the intake system 100 similar to those of the intake system 20 will be denoted by the same reference numerals and description thereof may be omitted.

Figure 8:
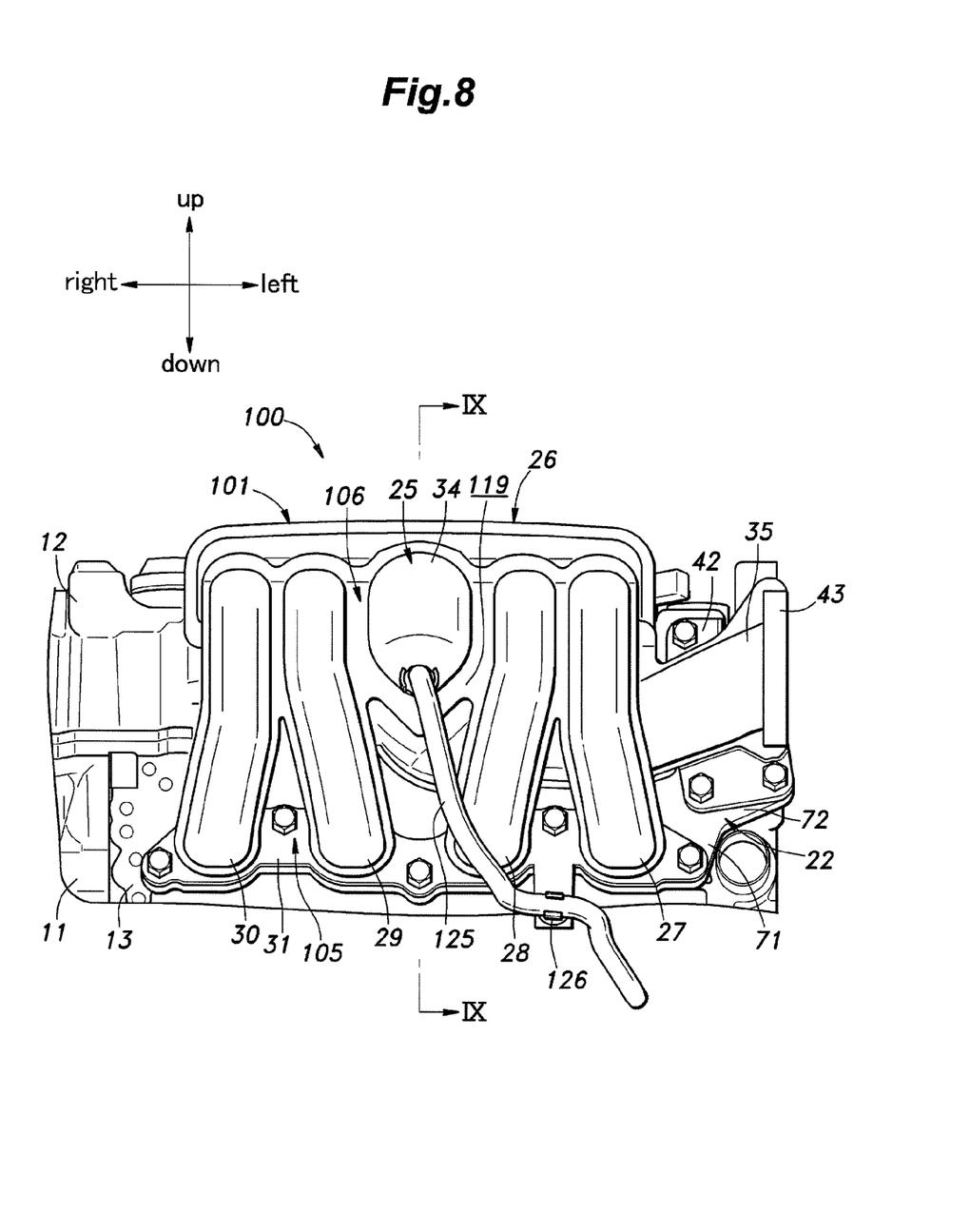
FIG. 8 is a side view of an engine including an intake system according to the second embodiment.
Figure 9:
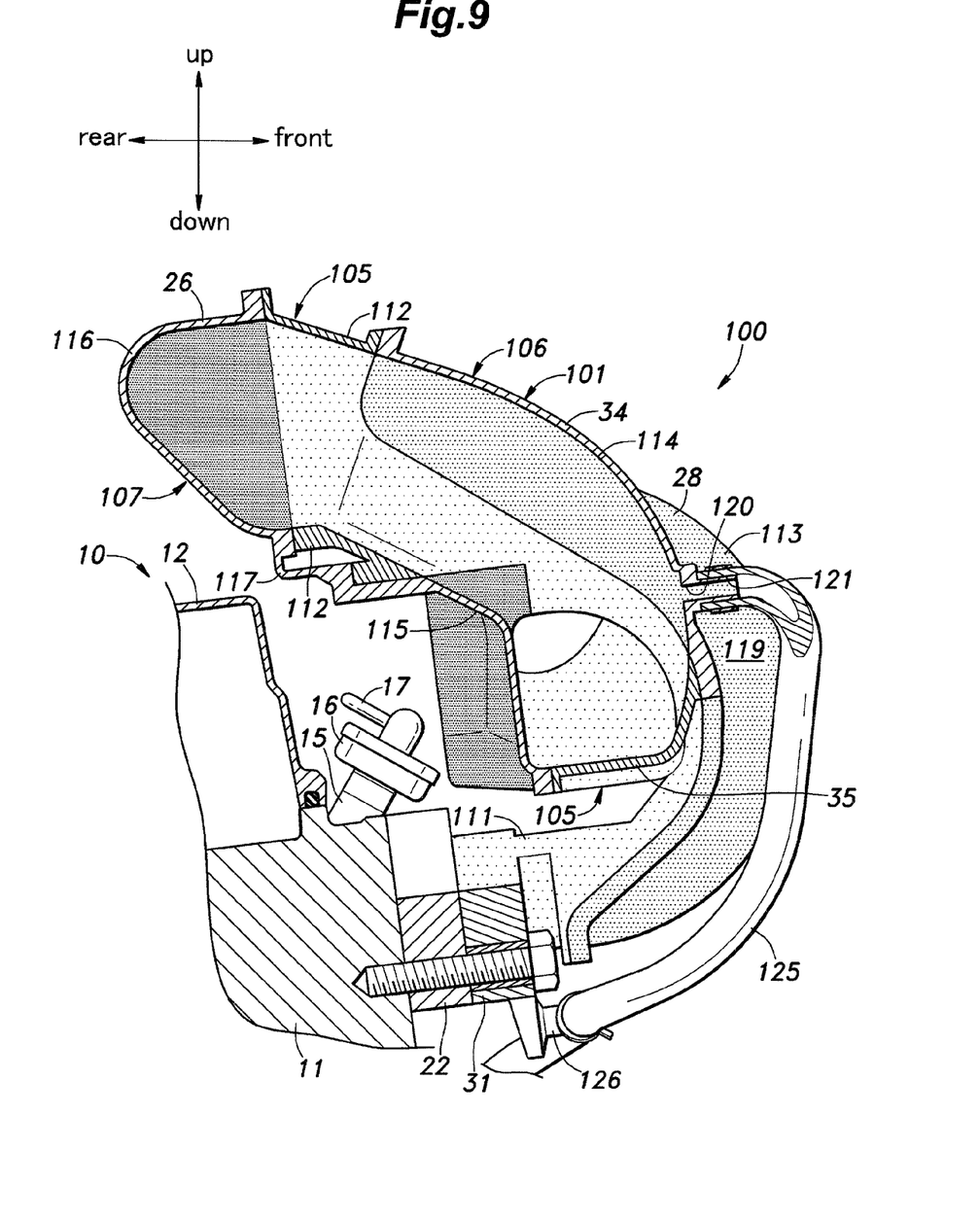
FIG. 9 is a cross-sectional view taken along line IX-IX in FIG. 8.

As shown in FIGS. 8 and 9, similarly to the intake manifold 21 of the first embodiment, the intake manifold 101 of the intake system 100 includes the intake air introduction pipe 25, the intake chamber 26, the four branch pipes 27-30, the first flange portion 31, and the second flange portion 42. Though not shown in the drawings, the second flange portion 42 has the EGR introduction hole 41 formed therein as in the intake manifold 21.

Unlike the intake manifold 21, the intake manifold 101 is constituted by three divided parts (first to third divided parts 105-107) each made of a resin material by injection molding. The first part 105 integrally includes: the first flange portion 31; a rear portion 111 of each branch pipe 27-30, the rear portion 111 being connected to the first flange portion 31; the upstream section 35 of the intake air introduction pipe 25, the upstream section 35 being connected to the rear portion 111 of each branch pipe 27-30; and a front portion 112 of the intake chamber 26, the front portion 112 being connected to the downstream end of the rear portion 111 of each branch pipe 27-30. The second part 106 integrally includes a front portion of each branch pipe 27-30, and a front portion 114 of the downstream section 34 of the intake air introduction pipe 25. The third part 107 integrally includes: a rear portion 115 of the downstream section 34 of the intake air introduction pipe 25; a rear portion 116 of the intake chamber 26; and a flexible connection piece 117 that connects the rear portion 115 of the downstream section 34 and the rear portion 116 of the intake chamber 26. By joining the first to third parts 105-107 to each other, the upstream section 35 and the downstream section 34 of the intake air introduction pipe 25, the intake chamber 26, and the branch pipes 27-30 are formed.

As shown in FIG. 9, the front end of the downstream section 34 of the intake air introduction pipe 25 is displaced rearward from the front end of each branch pipe 27-30. As a result, the intake manifold 101 is provided with a recess 119 that recedes rearward at the downstream section 34 of the intake air introduction pipe 25. Formed in the front surface of the downstream section 34 of the intake air introduction pipe 25 at a position near the upstream end of the downstream section 34 is a blow-by gas introduction passage 120, which is a through-hole for introduction of blow-by gas. A joint portion 121, which is a cylindrical boss that protrudes frontward, is formed around the periphery of the blow-by gas introduction passage 120. In this embodiment, the blow-by gas introduction passage 120 and the joint portion 121 are formed in the second part 106. The front end of the joint portion 121 is positioned rearward of the front end of each branch pipe 27-30 so as not to project from the recess 119 formed in the intake manifold 101.

To the joint portion 121 is connected one end of a blow-by gas supply pipe 125, which is a pipe for supplying blow-by gas. The other end of the blow-by gas supply pipe 125 is connected to a blow-by gas supply passage (not shown in the drawings) formed in the cylinder head 11 or a cylinder block (not shown in the drawings). The blow-by gas supply passage is a passage for circulating the blow-by gas leaking into the crankcase from each cylinder, and may be provided with a breather chamber and/or an oil mist separator in the path defined thereby. Preferably, at least a part of the blow-by gas supply pipe 125 is positioned in the recess 119. The first flange portion 31 is provided with a clamp 126 to hold a longitudinal part of the blow-by gas supply pipe 125.

In the intake system 100 according to the second embodiment configured as described in the foregoing, the blow-by gas introduction passage 120 is formed in the downstream section 34 of the intake air introduction pipe 25 where the intake air is yet to be split into branches, and therefore, the structure of the blow-by gas introduction passage 120 can be simplified as compared to a case where the blow-by gas is introduced into a part where the intake air has been split into branches (for example, the intake system 20 of the first embodiment). Further, in a case where the blow-by gas supply passage is formed in the cylinder block, the length of the blow-by gas supply pipe 125 can be reduced.

Figure 10:
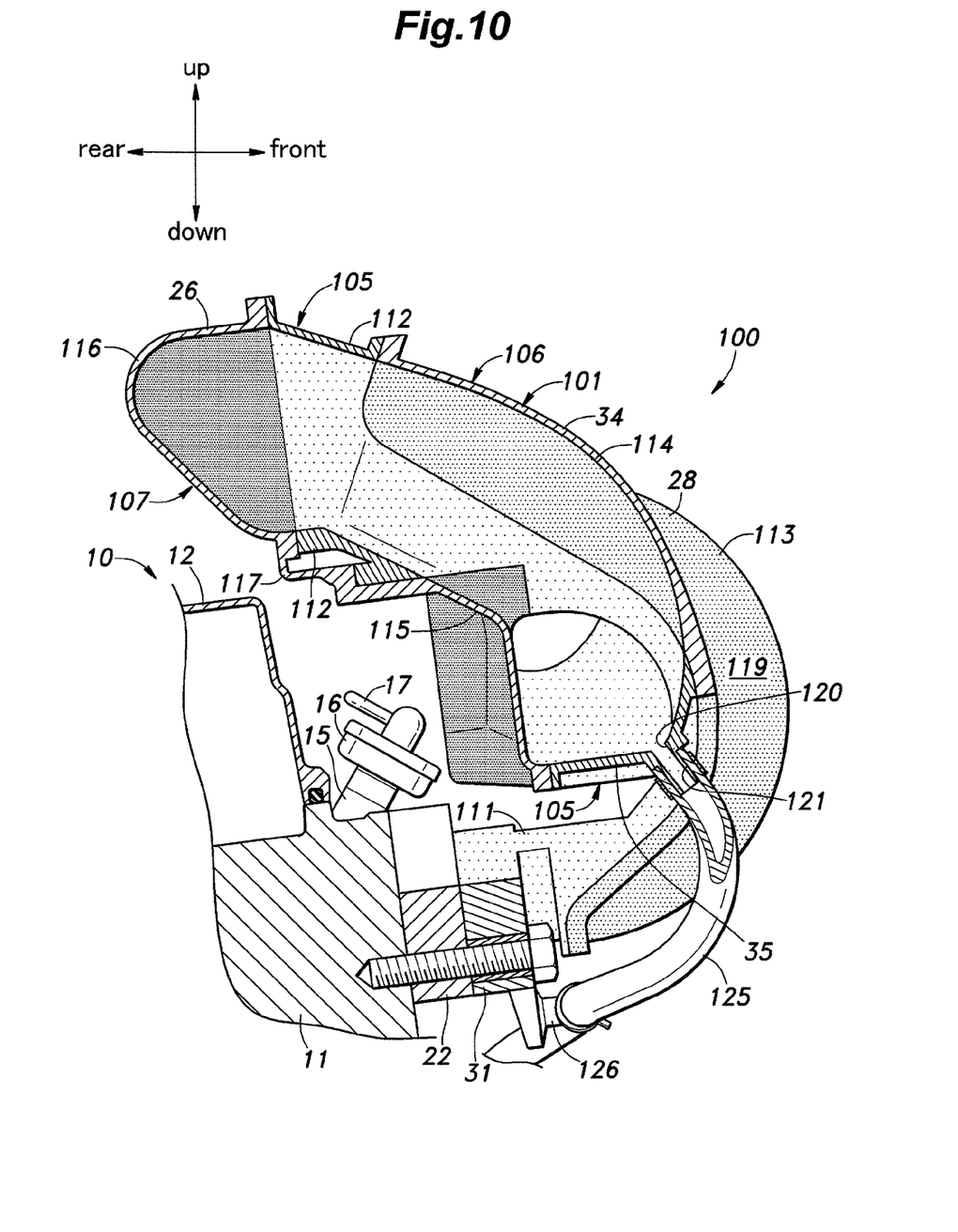
FIG. 10 is a cross-sectional view showing a partially modified embodiment of the intake system according to the second embodiment.

Furthermore, since the blow-by gas introduction passage 120 is formed in the downstream section 34 of the intake air introduction pipe 25, it is possible to ensure a distance between the blow-by gas introduction passage 120 and the EGR introduction hole 41 formed in the upstream section 35 of the intake air introduction pipe 25. Therefore, clogging of the EGR introduction hole 41 caused by oil in the blow-by gas can be prevented. The position of the blow-by gas introduction passage 120 is only required to be spaced apart from the EGR introduction hole 41 to such an extent that the oil in the blow-by gas does not cause clogging of the EGR introduction hole 41, and thus, the blow-by gas introduction passage 120 may be provided in the vicinity of the boundary between the upstream section 35 and the downstream section 34 of the intake air introduction pipe 25, as is illustrated in a partially modified embodiment shown in FIG. 10. In this case, the blow-by gas introduction passage 120 and the joint portion 121 are formed in the first part 105.

Further, since the joint portion 121 and the blow-by gas supply pipe 125 are disposed in the recess 119 formed in the intake manifold 101, the layout of the blow-by gas supply pipe 125 can be simplified and the intake system 100 can be made compact.

In this embodiment, blow-by gas is introduced into the intake air introduction pipe 25, and thus, unlike the intake system 20 of the first embodiment, it is unnecessary to provide the blow-by gas distribution groove 77 in the intake plate 22. Therefore, the intake plate 22 may be omitted. In the case where the intake plate 22 is omitted, the EGR introduction hole 41 of the intake manifold 101 and the EGR supply passage 78 of the cylinder head 11 may be connected to each other via another pipe. This pipe may be formed integrally with the intake manifold 101 or the cylinder head 11.

Concrete embodiments of the present invention have been described in the foregoing, but the present invention is not limited by the foregoing embodiments and can be changed in various manners. For instance, it is possible to have each branch pipe 27-30 curved downward from the downstream end to the upstream end thereof, and to dispose the intake chamber 26 at a position lower than the intake port 14. In this case, it will be preferred if the intake chamber 26 is disposed close to the cylinder block and the intake air introduction pipe 25 is disposed between the branch pipes 27-30 and the cylinder block. Namely, the intake manifold in this case will have a substantially vertically inverted shape of the intake manifold 21 of the above-described embodiment. Further, the engine 10 may be disposed horizontally such that the cylinder axis is parallel with the fore and aft direction or the left and right direction.

GLOSSARY 10 engine
11 cylinder head
13 front surface
14 intake port
15 fuel injection device
16 delivery pipe
17 first fuel pipe
20, 100 intake system
21, 101 intake manifold
22 intake plate
25 intake air introduction pipe
26 intake chamber
27-30 branch pipe
31 first flange portion
34 downstream section
35 upstream section
36 intake air guiding wall
37 upper wall
38 lower wall
41 EGR introduction hole
42 second flange portion
43 third flange portion
51-56 divided part
71 base portion
72 extension portion
73 intake passage
74 EGR passage
75 EGR introduction pipe
120 blow-by gas introduction passage
121 joint portion
125 blow-by gas supply pipe

The invention claimed is:

1. An intake system, comprising:
   a plurality of branch pipes which are arranged one next to the other and communicate at downstream ends thereof with a plurality of intake ports provided in an engine, respectively, each branch pipe extending from the downstream end thereof to an upstream end thereof in a curved manner such that a space is defined between the branch pipes and the engine, each branch pipe having an upstream section including the upstream end of the branch pipe and a downstream section including the downstream end of the branch pipe;
   an intake chamber communicating with the upstream ends of the branch pipes; and
   an intake air introduction pipe having a downstream end communicating with the intake chamber,
   wherein the intake air introduction pipe comprises:
   a downstream section disposed between the upstream sections of adjacent two of the branch pipes and extending from the downstream end of the intake air introduction pipe along the upstream sections of the branch pipes; and
   an upstream section which curves from an upstream end of the downstream section and extends in a substantially horizontal direction in the space defined between the branch pipes and the engine, the upstream section having an upstream end projecting out in the substantially horizontal direction.

2. The intake system according to claim 1, wherein the intake system comprises an even number of the branch pipes such that the upstream sections of the branch pipes are arranged symmetrically about the downstream section of the intake air introduction pipe.

3. The intake system according to claim 2, wherein:
   the intake ports open out from the engine in a first direction;
   the intake chamber faces the engine in a direction perpendicular to the first direction; and the branch pipes curve in such a manner that a convex side of each branch pipe faces in the first direction away from the engine.

4. The intake system according to claim 3, wherein an intake air guiding wall extends from a pipe wall of the intake air introduction pipe into the intake chamber at a portion of the intake air introduction pipe communicating with the intake chamber.

5. The intake system according to claim 4, wherein the intake air guiding wall connects mutually opposing inner surfaces of the intake chamber to each other.

6. The intake system according to claim 2, wherein an intake air guiding wall extends from a pipe wall of the intake air introduction pipe into the intake chamber at a portion of the intake air introduction pipe communicating with the intake chamber.

7. The intake system according to claim 6, wherein the intake air guiding wall connects mutually opposing inner surfaces of the intake chamber to each other.

8. The intake system according to claim 1, wherein an intake air guiding wall extends from a pipe wall of the intake air introduction pipe into the intake chamber at a portion of the intake air introduction pipe communicating with the intake chamber.

9. The intake system according to claim 8, wherein the intake air guiding wall connects mutually opposing inner surfaces of the intake chamber to each other.

10. The intake system according to claim 1, wherein the plurality of branch pipes are arranged substantially side-by-side in a second direction, and the upstream section of the intake air introduction pipe extends along the second direction such that an upstream end of the upstream section is positioned in the second direction.

11. The intake system according to claim 10, wherein the second direction is substantially perpendicular to an extending direction of the downstream section of the intake air introduction pipe.

12. An intake system, comprising: a plurality of branch pipes which are arranged one next to the other and communicate at downstream ends thereof with a plurality of intake ports provided in an engine, respectively, each branch pipe extending from the downstream end thereof to an upstream end thereof in a curved manner such that a space is defined between the branch pipes and the engine, each branch pipe having an upstream section including the upstream end of the branch pipe and a downstream section including the downstream end of the branch pipe; an intake chamber communicating with the upstream ends of the branch pipes; and an intake air introduction pipe having a downstream section including a downstream end communicating with the intake chamber, wherein the intake air introduction pipe has a section that extends in the space defined between the branch pipes and the engine in a substantially horizontal direction, wherein: the intake ports open out from the engine in a first direction; the intake chamber faces the engine in a direction perpendicular to the first direction; and the branch pipes curve in such a manner that a convex side of each branch pipe faces in the first direction away from the engine, and wherein the upstream sections of the plurality of branch pipes and the downstream section of the intake air introduction pipe are connected to the intake chamber from a same direction such that ends of the upstream sections of the plurality of branch pipes and an end of the downstream section of the intake air introduction pipe are in the same plane of the intake chamber.

13. The intake system according to claim 12, wherein an intake air guiding wall extends from a pipe wall of the intake air introduction pipe into the intake chamber at a portion of the intake air introduction pipe communicating with the intake chamber.

14. The intake system according to claim 13, wherein the intake air guiding wall connects mutually opposing inner surfaces of the intake chamber to each other.

* * * * *